US009908070B2

(12) United States Patent
Carrion et al.

(10) Patent No.: US 9,908,070 B2
(45) Date of Patent: Mar. 6, 2018

(54) FUEL TANK INERTING PREFILTER ASSEMBLIES, DEVICES, AND METHODS OF USE

(71) Applicant: Pall Corporation, Port Washington, NY (US)

(72) Inventors: Alexander Carrion, Tampa, FL (US); Rajesh D. Patel, Wesley Chapel, FL (US); David Jonathan Stein, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 367 days.

(21) Appl. No.: 14/948,894

(22) Filed: Nov. 23, 2015

(65) Prior Publication Data

US 2017/0144128 A1 May 25, 2017

(51) Int. Cl.
*B01D 46/00* (2006.01)
*B01D 46/52* (2006.01)
*B01D 46/54* (2006.01)
*B01D 51/10* (2006.01)
*B01D 53/04* (2006.01)
(Continued)

(52) U.S. Cl.
CPC ..... *B01D 46/0024* (2013.01); *B01D 46/0027* (2013.01); *B01D 46/0031* (2013.01); *B01D 46/0036* (2013.01); *B01D 46/2411* (2013.01); *B01D 46/521* (2013.01); *B01D 46/543* (2013.01); *B01D 51/10* (2013.01); *B01D 53/04* (2013.01); *B01D 53/0431* (2013.01); *B01D 53/8675* (2013.01); *B01J 15/005* (2013.01); *B01J 19/14* (2013.01); *B01D 2253/102* (2013.01); *B01D 2253/104* (2013.01); *B01D 2253/108* (2013.01); *B01D 2255/2073* (2013.01); *B01D 2257/106* (2013.01); *B01D 2257/708* (2013.01); *B01D 2257/80* (2013.01);
(Continued)

(58) Field of Classification Search
CPC ............ B01D 46/0024; B01D 46/0031; B01D 46/0036; B01D 53/0431; B01D 53/8675; B01D 46/2411; B01D 46/0027; B01D 51/10; B01D 2257/106; B01D 2257/708; B01D 2253/102; B01D 2253/104; B01D 2253/108; B01D 2255/2073; B01D 46/521; B01D 46/543; B01J 19/14; B60K 2015/03236
See application file for complete search history.

(56) References Cited

U.S. PATENT DOCUMENTS

| 4,231,768 A | 11/1980 | Seibert et al. |
| 4,331,460 A | 5/1982 | Dillman et al. |

(Continued)

FOREIGN PATENT DOCUMENTS

| EP | 1 286 752 B1 | 3/2003 |
| GB | 2 157 971 A | 11/1985 |

(Continued)

OTHER PUBLICATIONS

European Patent Office, European Search Report in corresponding European Application No. 16 18 9170, dated Jun. 8, 2017.
(Continued)

*Primary Examiner* — Robert Clemente
(74) *Attorney, Agent, or Firm* — Leydig Voit & Mayer

(57) ABSTRACT

Fuel tank inerting prefilter assemblies, fuel tank inerting prefilter devices, and methods for treating fluids, particularly process fluids used in fuel inerting tank systems, are disclosed.

20 Claims, 10 Drawing Sheets

(51) Int. Cl.
    *B01J 15/00*     (2006.01)
    *B01J 19/14*     (2006.01)
    *B01D 46/24*     (2006.01)
    *B01D 53/86*     (2006.01)
    *B60K 15/03*     (2006.01)

(52) U.S. Cl.
    CPC ............ *B01D 2259/4566* (2013.01); *B60K 2015/03236* (2013.01); *B60K 2015/03381* (2013.01)

(56) References Cited

U.S. PATENT DOCUMENTS

| | | | |
|---|---|---|---|
| 4,336,043 A | 6/1982 | Aonuma et al. | |
| 5,891,402 A | 4/1999 | Sassa et al. | |
| 5,997,619 A | 12/1999 | Knuth et al. | |
| 7,115,150 B2 | 10/2006 | Johnson et al. | |
| 7,645,312 B2 | 1/2010 | Hamlin et al. | |
| 8,017,011 B2 | 9/2011 | Ellis et al. | |
| 8,517,185 B2 | 8/2013 | Wieczorek et al. | |
| 2002/0194991 A1 | 12/2002 | Olsson et al. | |
| 2006/0201119 A1 | 9/2006 | Song | |
| 2007/0028571 A1 | 2/2007 | Barratt | |
| 2011/0038771 A1 | 2/2011 | Buelow et al. | |
| 2014/0020561 A1 | 1/2014 | Aery | |
| 2014/0116249 A1 | 5/2014 | Evosevich et al. | |
| 2014/0208948 A1 | 7/2014 | Cao | |
| 2014/0255283 A1 | 9/2014 | Sidheswaran et al. | |
| 2015/0059300 A1 | 3/2015 | Biswas et al. | |

FOREIGN PATENT DOCUMENTS

| | | |
|---|---|---|
| GB | 2 261 830 A | 6/1993 |
| JP | 2014-108387 A | 6/2014 |
| WO | WO 2017/053987 A1 | 3/2017 |

OTHER PUBLICATIONS

"OBIGGS Filter", *Pall Corporation*, http://www.pall.com/main/aerospace-defense-marine/product.page?id=54584, printed Nov. 4, 2015.

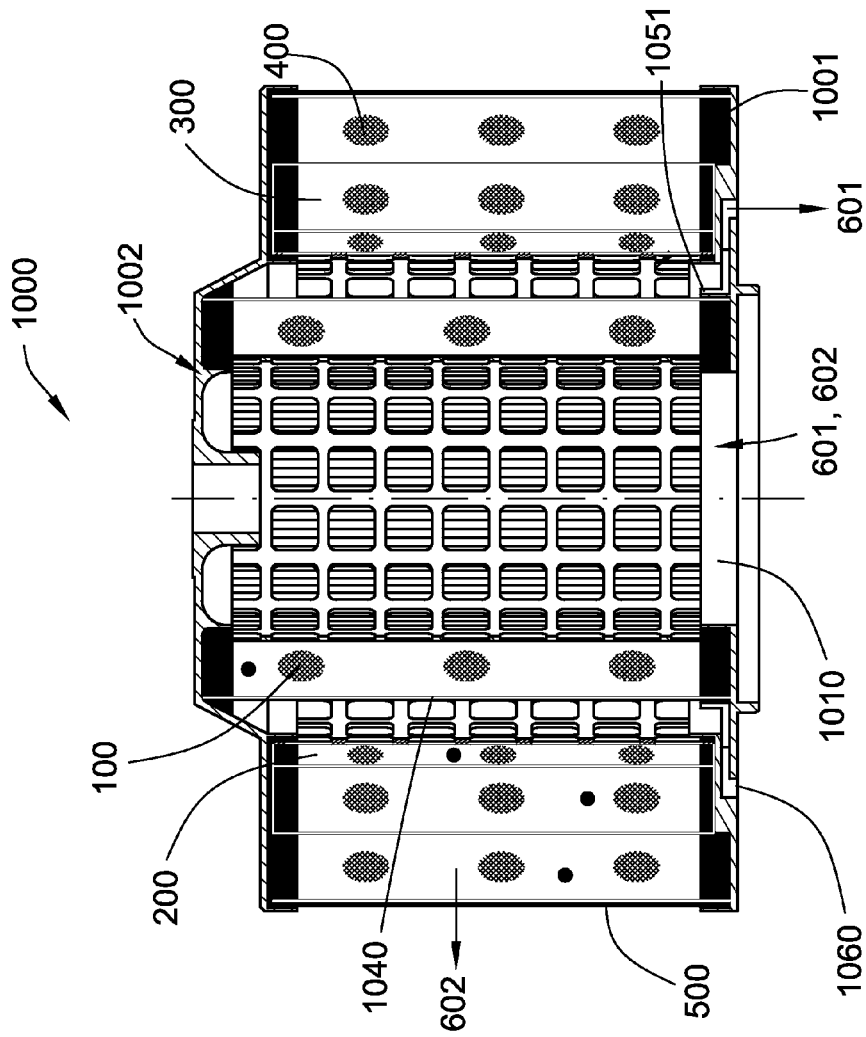
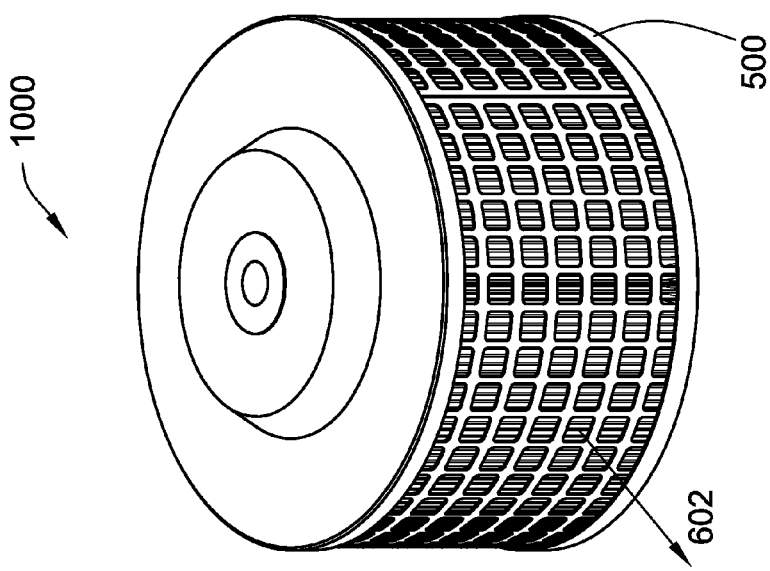

FUEL TANK INERTING PREFILTER ASSEMBLIES, DEVICES, AND METHODS OF USE

BACKGROUND OF THE INVENTION

Flammability reduction systems, such as on-board inert gas generation systems (OBIGGS), nitrogen generation systems (NGS), flammability reduction systems (FRS), and fuel tank inerting systems (FTIS), are commonly used to reduce fuel tank combustion. In these systems, pressurized air from an engine, e.g., engine bleed air or process air, is passed through a membrane module, such as an air separation module (ASM), to separate oxygen from the process air, producing an oxygen-depleted inert gas such as primarily nitrogen-enriched air (NEA). The inert gas is introduced into the ullage (i.e., the space above the liquid fuel) in the fuel tank where it displaces the flammable fuel/air mixture to reduce the risk of an explosion or fire.

This process air, however, typically contains undesirable material, including particulate contaminants, as well as water and oil aerosols. This undesirable material can degrade the performance of the ASM.

However, while some filters for filtering process air are available, there is a need for improved filters.

BRIEF SUMMARY OF THE INVENTION

An embodiment of the invention provides a fuel tank inerting prefilter assembly comprising (a) a first endcap, wherein the first endcap includes a first side and a second side and a central opening passing from the first side through the second side; (b) a second endcap; (c) a first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium; (d) a second hollow cylindrical fluid treatment filter comprising an ozone depleting arrangement, the ozone depleting arrangement comprising an ozone depleting material (such as a deposited catalyst); (e) a third hollow cylindrical fluid treatment filter comprising an organic vapor depleting arrangement, the organic vapor depleting arrangement comprising activated carbon, zeolites, and/or activated alumina; and, (f) a fourth hollow cylindrical fluid treatment filter comprising a particulate removal arrangement comprising a pleated porous medium, the filter having an ultra low penetration air (ULPA) filter rating or a high efficiency particulate air (HEPA) filter rating; wherein the first hollow cylindrical fluid treatment filter, the second hollow cylindrical fluid treatment filter, the third hollow cylindrical fluid treatment filter, and the fourth hollow cylindrical fluid treatment filter are coaxially arranged, forming a filter unit having a top end and a bottom end; and, wherein the first endcap is bonded to the top end of the filter unit and the second endcap is bonded to the bottom end of the filter unit; the filter assembly defining a first fluid flow path and a second fluid flow path, wherein (i) the first hollow cylindrical fluid treatment filter is disposed across the first fluid flow path and the second fluid flow path, and (ii) the second hollow cylindrical fluid treatment filter, the third hollow cylindrical fluid treatment filter, and the fourth hollow cylindrical fluid treatment filter are disposed across the second fluid flow path.

In an embodiment, the fuel tank inerting prefilter assembly includes a coaxial gap between the coaxially arranged first hollow cylindrical fluid treatment filter and the second hollow cylindrical fluid treatment filter, preferably, wherein the first fluid flow path includes the coaxial gap.

In another embodiment, a fuel tank inerting prefilter device is provided, the device comprising a housing comprising a first section and a second section, the first section comprising an inlet port and an outlet port and a coalesced fluid outlet port, the second section comprising a cavity for receiving the fuel tank inerting prefilter assembly, wherein the filter assembly is arranged in the housing, the inlet port directing untreated fluid into the first fluid flow path and the second fluid flow path, the outlet port directing treated fluid from the second fluid flow path, and the coalesced fluid outlet port directing coalesced fluid from the first fluid flow path.

Another embodiment of the invention comprises a method for removing contaminants from process air, the method comprising (a) passing the process air through a first hollow cylindrical fluid treatment filter having a first filter upstream surface and a first filter downstream surface, the first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium, providing a discontinuous phase concentrated fluid separated from a discontinuous phase-depleted fluid; (b) passing the discontinuous phase-depleted fluid from the first filter downstream surface through a second hollow cylindrical fluid treatment filter having a second filter upstream surface and a second filter downstream surface, the second hollow cylindrical fluid treatment filter comprising an ozone depleting arrangement, the ozone depleting arrangement comprising an ozone depleting material (such as a deposited catalyst), providing an ozone- and discontinuous phase-depleted fluid passing from the second filter downstream surface; (c) passing the ozone- and discontinuous phase-depleted fluid through a third hollow cylindrical fluid treatment filter having a third filter upstream surface and a third filter downstream surface, the third hollow cylindrical filter comprising an organic vapor depleting arrangement, the organic vapor depleting arrangement comprising activated carbon, zeolites, and/or activated alumina, providing an organic vapor- and ozone- and discontinuous phase-depleted fluid passing from the third filter downstream surface; and, (d) passing the organic vapor- and ozone- and discontinuous phase-depleted fluid through a fourth hollow cylindrical fluid treatment filter having a fourth filter upstream surface and a fourth filter downstream surface, the fourth hollow cylindrical fluid treatment filter comprising a particulate removal arrangement comprising a pleated porous medium, the filter having an ultra low penetration air (ULPA) filter rating or a high efficiency particulate air (HEPA) filter rating, providing a filtered ULPA-rated or filtered HEPA-rated organic vapor- and ozone- and discontinuous phase-depleted fluid passing from the fourth filter downstream surface.

BRIEF DESCRIPTION OF THE SEVERAL VIEWS OF THE DRAWING(S)

Figure 3A:
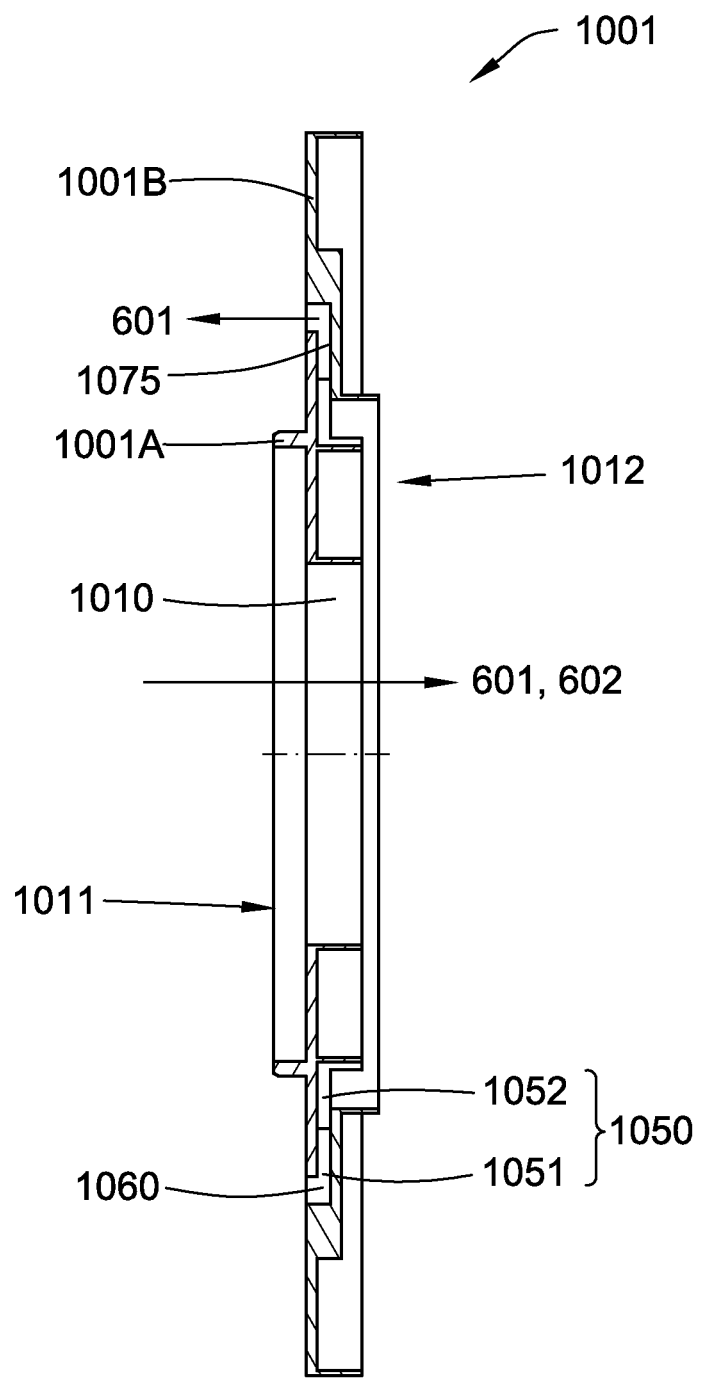
Figure 3B:
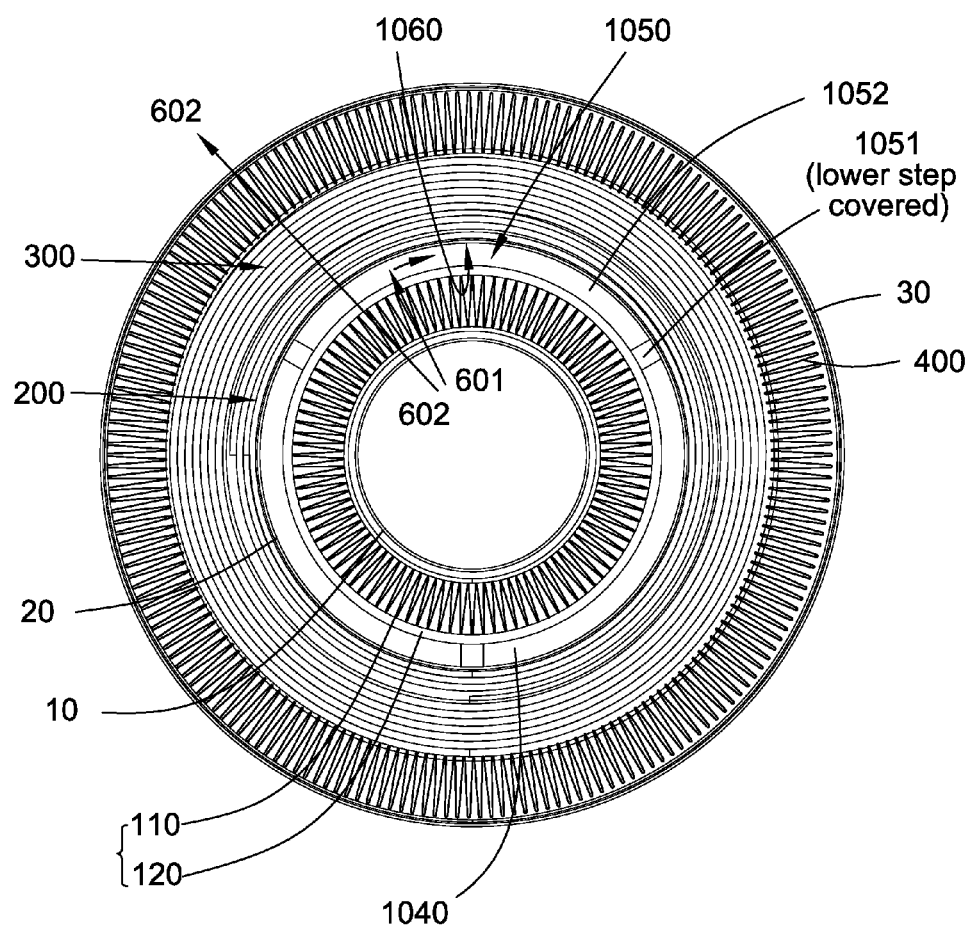

FIGS. 3A and 3B show one illustrative first end cap including a fluid flow channel for use with embodiments of fuel tank inerting prefilter assemblies according to the present invention, wherein FIG. 3A shows a cross-sectional view (also showing a step-wise channel portion of the fluid flow channel), and FIG. 3B shows a top view (also showing an annular channel portion of the fluid flow channel, and a cross-sectional view of the filter unit).

Figure 3C:
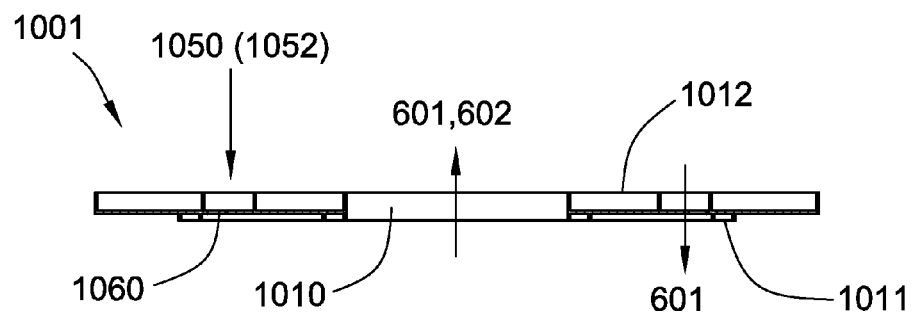
Figure 3D:
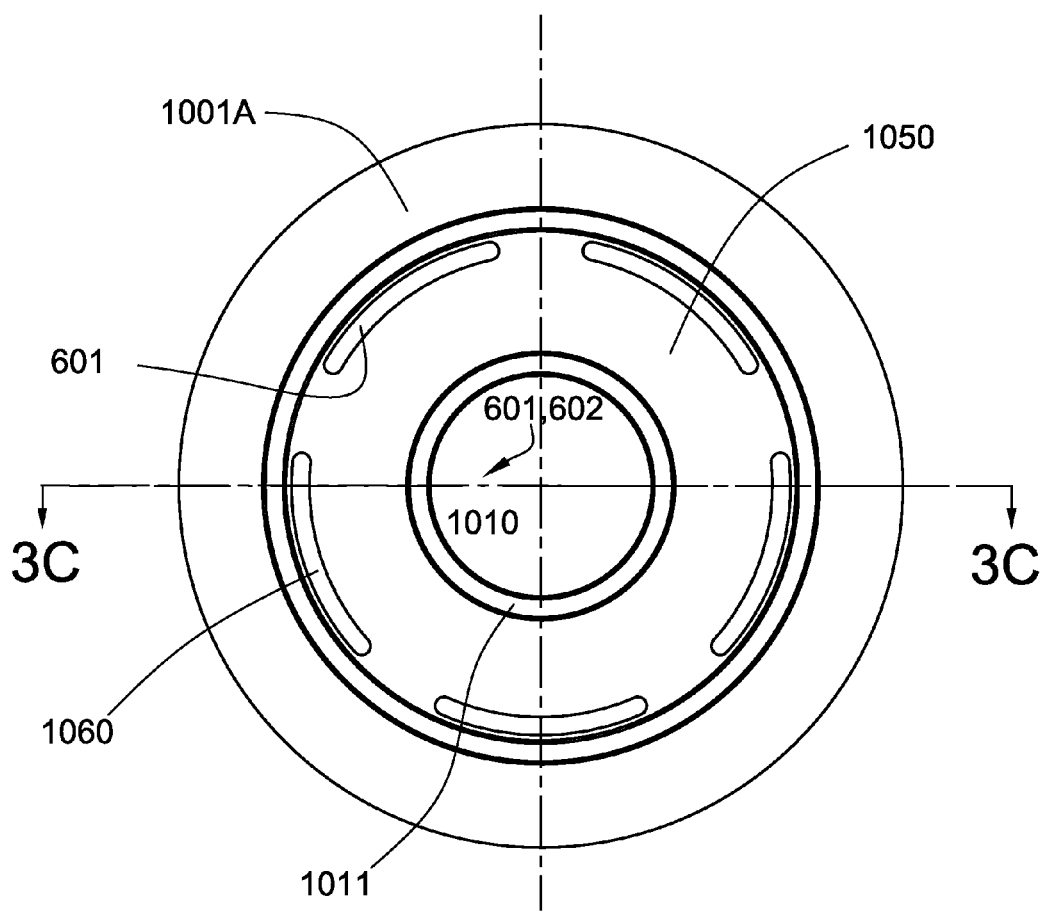

FIGS. 3C and 3D show another illustrative first end cap including a fluid flow channel for use with embodiments of fuel tank inerting prefilter assemblies according to the present invention, wherein the fluid flow path does not include a step-wise channel portion, FIG. 3C showing a cross-sectional view (also showing an annular channel portion of the fluid flow channel), and FIG. 3D showing a bottom view.

Figure 1:
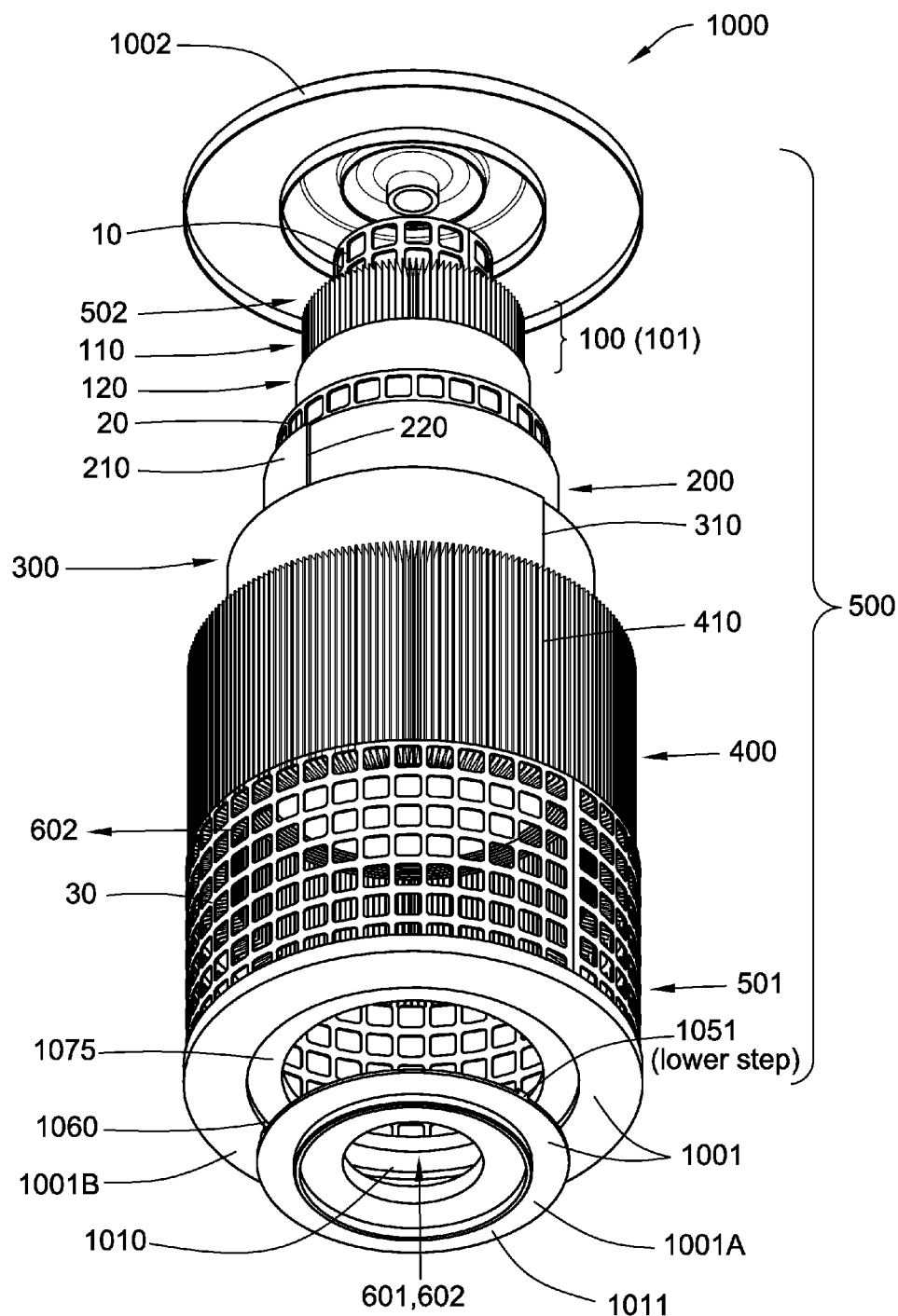
FIG. 1 shows an exploded view of an embodiment of a fuel tank inerting prefilter assembly according to the present invention, the assembly comprising first and second end caps, and a filter unit comprising coaxially arranged first, second, third, and fourth, hollow cylindrical fluid treatment filters.

FIG. 4A shows a cross-sectional side view, and FIG. 4B shows an isometric view, of the embodiment of a fuel tank inerting prefilter assembly shown in FIG. 1.

Figure 5A:
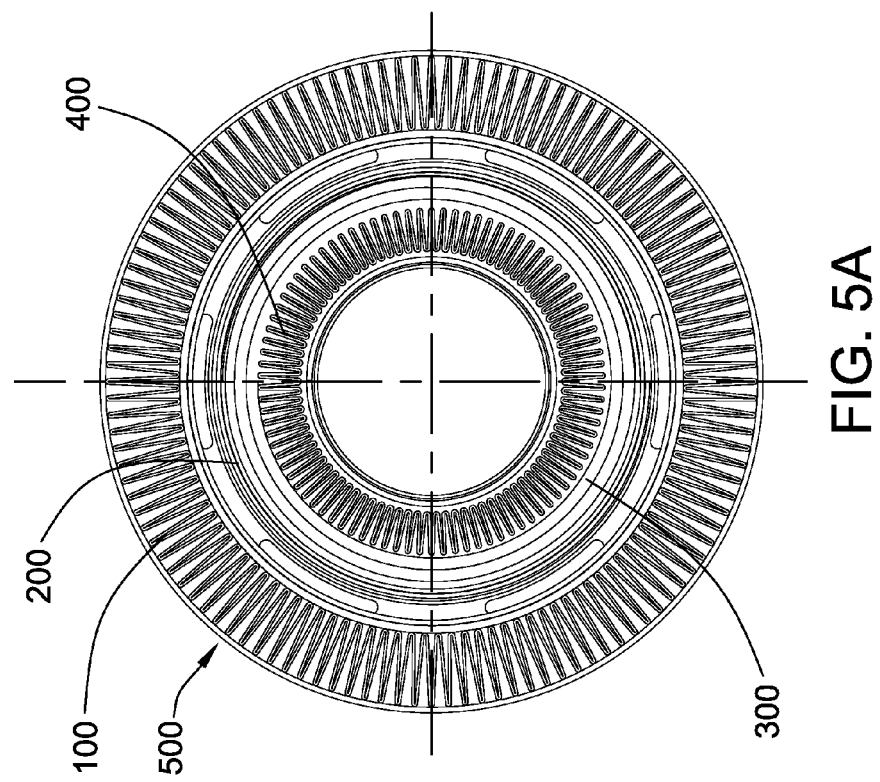

FIGS. 5A (full view) and 5B (section view "A") show a cross-sectional top view of another filter unit for use in another embodiment of a fuel tank inerting prefilter assembly according to the present invention, showing first and second fluid flowpaths, wherein the fluid flow is "outside-in," in contrast with the "inside-out" flow shown in FIG. 1.

Figure 6A:
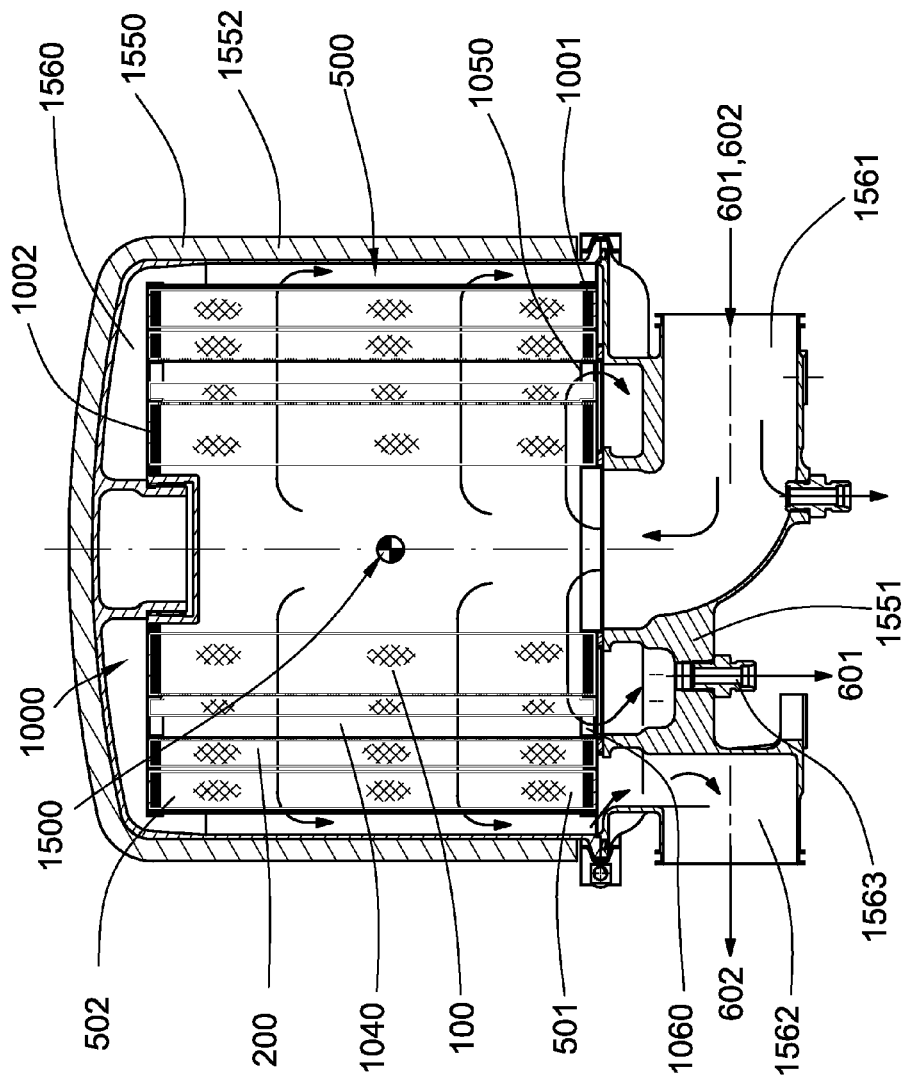

FIG. 6A shows a cross-sectional view of an embodiment of a fuel tank inerting prefilter device according to the present invention, comprising a housing having a first section and a second section, and an embodiment of a fuel tank inerting prefilter assembly arranged in the housing, also showing the first and second fluid flow paths, also showing the illustrative first end cap (shown in FIGS. 3C and 3D) including a fluid flow channel for use with embodiments of fuel tank inerting prefilter assemblies according to the present invention, wherein the fluid flow channel does not include a step-wise channel portion.

Figure 6B:
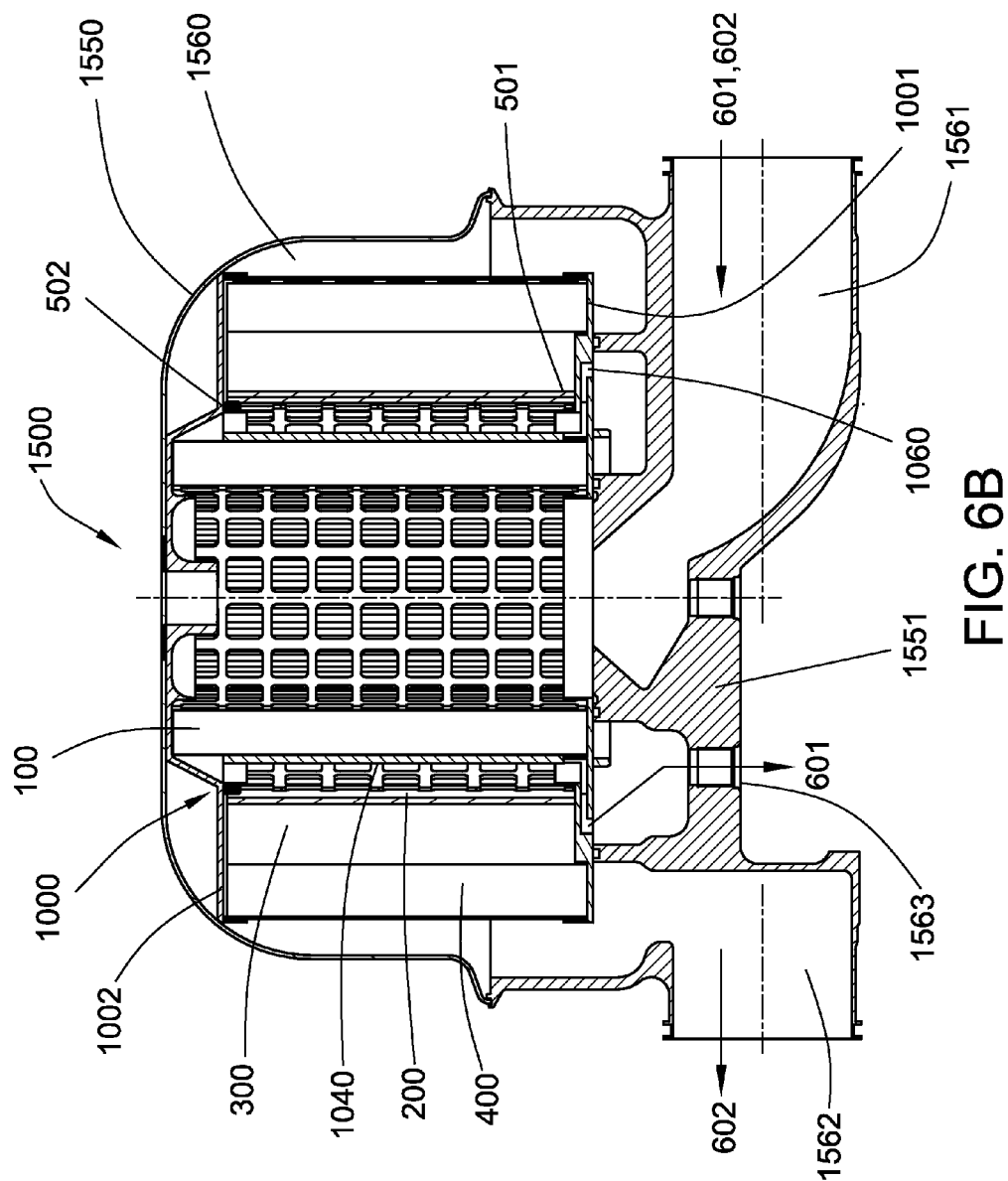

FIG. 6B shows a cross-sectional view of an embodiment of a fuel tank inerting prefilter device according to the present invention, comprising a housing having a first section and a second section, and an embodiment of a fuel tank inerting prefilter assembly arranged in the housing, also showing the first and second fluid flow paths, also showing the illustrative first end cap (shown in FIGS. 3A and 3B) including a fluid flow channel for use with embodiments of fuel tank inerting prefilter assemblies according to the present invention, wherein the fluid flow channel includes a step-wise channel portion.

Figure 7:
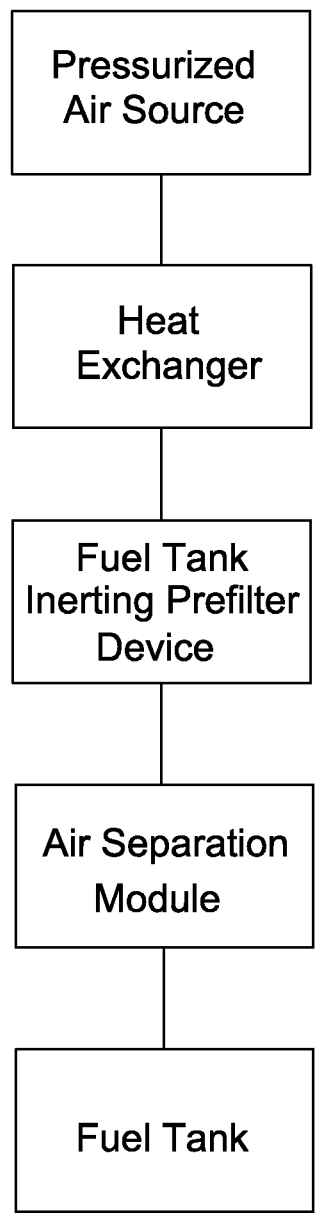

FIG. 7 is a diagrammatic flow chart showing the use of fuel tank inerting prefilter device in an OBIGGS or a FTIS system.

DETAILED DESCRIPTION OF THE INVENTION

In accordance with an embodiment of the present invention, a fuel tank inerting prefilter assembly is provided comprising (a) a first endcap, wherein the first endcap includes a first side and a second side and a central opening passing from the first side through the second side; (b) a second endcap; (c) a first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium; (d) a second hollow cylindrical fluid treatment filter comprising an ozone depleting arrangement, the ozone depleting arrangement comprising an ozone depleting material (such as a deposited catalyst, for example, comprising manganese dioxide); (e) a third hollow cylindrical fluid treatment filter comprising an organic vapor depleting arrangement, the organic vapor depleting arrangement comprising activated carbon, zeolites, and/or activated alumina; and, (f) a fourth hollow cylindrical fluid treatment filter comprising a particulate removal arrangement comprising a pleated porous medium, the filter having an ultra low penetration air (ULPA) filter rating or a high efficiency particulate air (HEPA) filter rating; wherein the first hollow cylindrical fluid treatment filter, the second hollow cylindrical fluid treatment filter, the third hollow cylindrical fluid treatment filter, and the fourth hollow cylindrical fluid treatment filter are coaxially arranged, forming a filter unit having a top end and a bottom end; and, wherein the first endcap is bonded to the top end of the filter unit and the second endcap is bonded to the bottom end of the filter unit; the filter assembly defining a first fluid flow path and a second fluid flow path, wherein (i) the first hollow cylindrical fluid treatment filter is disposed across the first fluid flow path and the second fluid flow path, and (ii) the second hollow cylindrical fluid treatment filter, the third hollow cylindrical fluid treatment filter, and the fourth hollow cylindrical fluid treatment filter are disposed across the second fluid flow path.

In an embodiment, the fuel tank inerting prefilter assembly includes a coaxial gap between the coaxially arranged first hollow cylindrical fluid treatment filter and the second hollow cylindrical fluid treatment filter, preferably, wherein the first fluid flow path includes the coaxial gap.

In one embodiment of the fuel tank inerting assembly, the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

In another embodiment, a fuel tank inerting prefilter device is provided, the device comprising a housing comprising a first section and a second section, the first section comprising an inlet port and an outlet port and a coalesced fluid outlet port, the second section comprising a cavity for receiving the fuel tank inerting prefilter assembly, wherein the filter assembly is arranged in the housing, the inlet port directing untreated fluid into the first fluid flow path and the second fluid flow path, the outlet port directing treated fluid from the second fluid flow path, and the coalesced fluid outlet port directing coalesced fluid from the first fluid flow path.

Another embodiment of the invention comprises a method for removing contaminants from process air, the method comprising (a) passing the process air through a first hollow cylindrical fluid treatment filter having a first filter upstream surface and a first filter downstream surface, the first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium, providing a discontinuous phase concentrated fluid separated from a discontinuous phase-depleted fluid; (b) passing the discontinuous phase-depleted fluid from the first filter downstream surface through a second hollow cylindrical fluid treatment filter having a second filter upstream surface and a second filter downstream surface, the second hollow cylindrical fluid treatment filter comprising an ozone depleting arrangement, the ozone depleting arrangement comprising a deposited catalyst comprising manganese dioxide, providing an ozone- and discontinuous phase-depleted fluid passing from the second filter downstream surface; (c) passing the ozone- and discontinuous phase-depleted fluid through a third hollow cylindrical fluid treatment filter having a third filter upstream surface and a third filter downstream surface, the third hollow cylindrical filter comprising an organic vapor depleting arrangement, the organic vapor depleting arrangement comprising activated carbon, zeolites, and/or activated alumina, providing an organic vapor- and ozone- and discontinuous phase-depleted fluid passing from the third filter downstream surface; and, (d) passing the organic vapor- and ozone- and discontinuous phase-depleted fluid through a fourth hollow cylindrical fluid treatment filter having a fourth filter upstream surface and a fourth filter downstream surface, the fourth hollow cylindrical fluid treatment filter comprising a particulate removal arrangement comprising a pleated porous medium, the filter having an ultra low penetration air (ULPA) filter rating or a high efficiency particulate air (HEPA) filter rating, providing a filtered ULPA-rated or filtered HEPA-rated organic vapor- and ozone- and discontinuous phase-depleted fluid passing from the fourth filter downstream surface.

Another embodiment of the invention comprises a method for removing contaminants from process air, the method comprising passing the process air through an embodiment of the fuel tank inerting assembly or the fuel tank inerting prefilter device, wherein the fourth hollow cylindrical treatment filter has an upstream surface and a downstream surface the method including passing a discontinuous phase fluid along the first fluid flow path, and passing a discontinuous phase-depleted fluid from the downstream surface of the fourth hollow cylindrical treatment filter.

Embodiments of the method comprise inside-out flow through the fuel tank inerting filter assembly and/or the fuel tank inerting prefilter device.

Other embodiments of the method comprise outside-in flow through the fuel tank inerting filter assembly and/or the fuel tank inerting prefilter device.

In some embodiments, the method further comprises passing the discontinuous phase-depleted fluid from the downstream surface of the fourth hollow cylindrical treatment filter through an Air Separation Module.

In another embodiment, a method of making fuel tank inerting assembly is provided, wherein fluid treatment filters can be installed individually, or in various combinations. For example, in one embodiment, the first hollow cylindrical treatment filter is installed separately from the second, third, and fourth hollow cylindrical treatment filters, wherein the second, third, and fourth hollow cylindrical treatment filters are combined as a unitary structure before installation as part of the assembly.

Figure 5B:
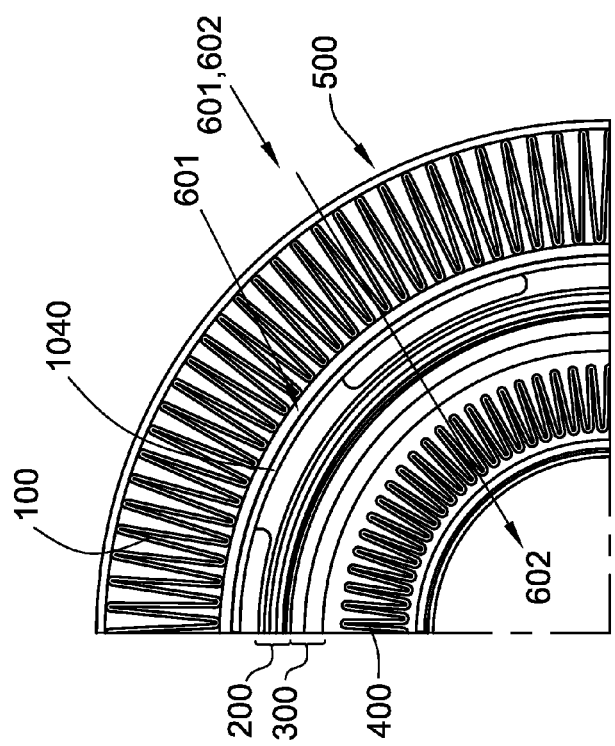

In accordance with the invention, air or gas can be cleaned and scrubbed of particulates, moisture (e.g., oil and/or water), ozone, and volatile organic compounds, providing extremely clean air or gas for use in highly sensitive and highly precise systems, such as ASM systems. Embodiments of the invention are suitable for inside-out flow applications (see, for example, FIG. 1) and outside-in flow applications (see, for example, FIG. 5).

High-efficiency particulate arrestance (HEPA) filters, sometimes called high-efficiency particulate arresting or high-efficiency particulate air filters, and ultra low penetration air (ULPA) filters, sometimes called ultra low penetration aerosol filters, satisfy certain standards of efficiency. To qualify as HEPA by U.S. government standards, the filter removes (from the air that passes through) 99.97% of particles that have a size of 0.3 μm. To qualify as ULPA by U.S. government standards, the filter removes from the air at least 99.999% of particles with a size of 0.12 μm.

Advantageously, by including an organic vapor depleting arrangement, and locating it in a fluid flow path between the ozone depleting arrangement and the particulate removal arrangement having an ULPA or HEPA filter rating, volatile organic compounds (VOCs) are depleted from the ozone-depleted process air before the air reaches the particulate removal arrangement having an ULPA or HEPA filter rating and before the air reaches the ASM, thus preventing or reducing damage to the particulate removal arrangement and/or the ASM, as they can be degraded due to the VOCs. The organic vapor depleting arrangement is particularly useful in reducing spikes of VOCs, wherein VOCs can be released downstream at significantly lower concentrations over time after a spike incident. For example, filter assemblies can remove 100%, or nearly 100%, of the initial VOC spike for a period of time, e.g., about 3 to about 7 minutes, and subsequently release VOCs at lower concentrations, e.g., about 50% or less after about 10 minutes.

Additionally, since the organic vapor depleting arrangement is located downstream of the ozone depleting arrangement, ozone, that could damage (e.g., degrade) elements of the organic vapor depleting arrangement (e.g., elements such as activated carbon, zeolites and/or activated alumina), is depleted or removed from the air before the air contacts and passes through the organic vapor depleting arrangement.

In addition to being especially suitable for fuel tank inerting systems, embodiments of the invention have a variety of additional applications, e.g., for any application that requires extremely clean air or gas, for example, SCUBA enriched air systems, hospital oxygen generating systems, and cabin air filters.

Each of the components of the invention will now be described in more detail below, wherein like components have like reference numbers.

The filters, filter units, and filter assemblies, can be any suitable shape; in accordance with the illustrated embodiments, they are preferably generally cylindrically shaped.

In the embodiments illustrated in FIGS. 1, 2, 4A, and 5, showing a fuel tank inerting prefilter assembly 1000, the first hollow cylindrical fluid treatment filter 100, the second hollow cylindrical fluid treatment filter 200, the third hollow cylindrical fluid treatment filter 300, and the fourth hollow cylindrical fluid treatment filter 400, are coaxially arranged, forming a filter unit 500 having a bottom end 501 and a top end 502, the bottom end being bonded to a first endcap 1001 and the top end being bonded to a second endcap 1002. As shown in FIGS. 4A, 6A, and 6B, the fuel tank inerting prefilter assembly 1000 provides a first fluid flow path 601 and a second fluid flow path 602, wherein the fluid flow is "inside-out". In contrast, FIG. 5 shows a filter unit 500 wherein the fluid flow is "outside-in."

Preferably, as shown in FIGS. 3B, 4A, 5B, 6A, and 6B, the fuel tank inerting prefilter assembly 1000 and filter 500 include a coaxial gap 1040 between the coaxially arranged first hollow cylindrical fluid treatment filter 100 and the second hollow cylindrical fluid treatment filter 200, wherein the first fluid flow path 601 includes the coaxial gap. FIG. 3D also shows the coaxial gap 1040.

In the embodiment illustrated in FIGS. 6A and 6B, a fuel tank inerting filter device 1500 comprises the fuel tank inerting prefilter assembly 1000 arranged in a housing 1550, the housing having a first section 1551 and a second section 1552.

Figure 2:
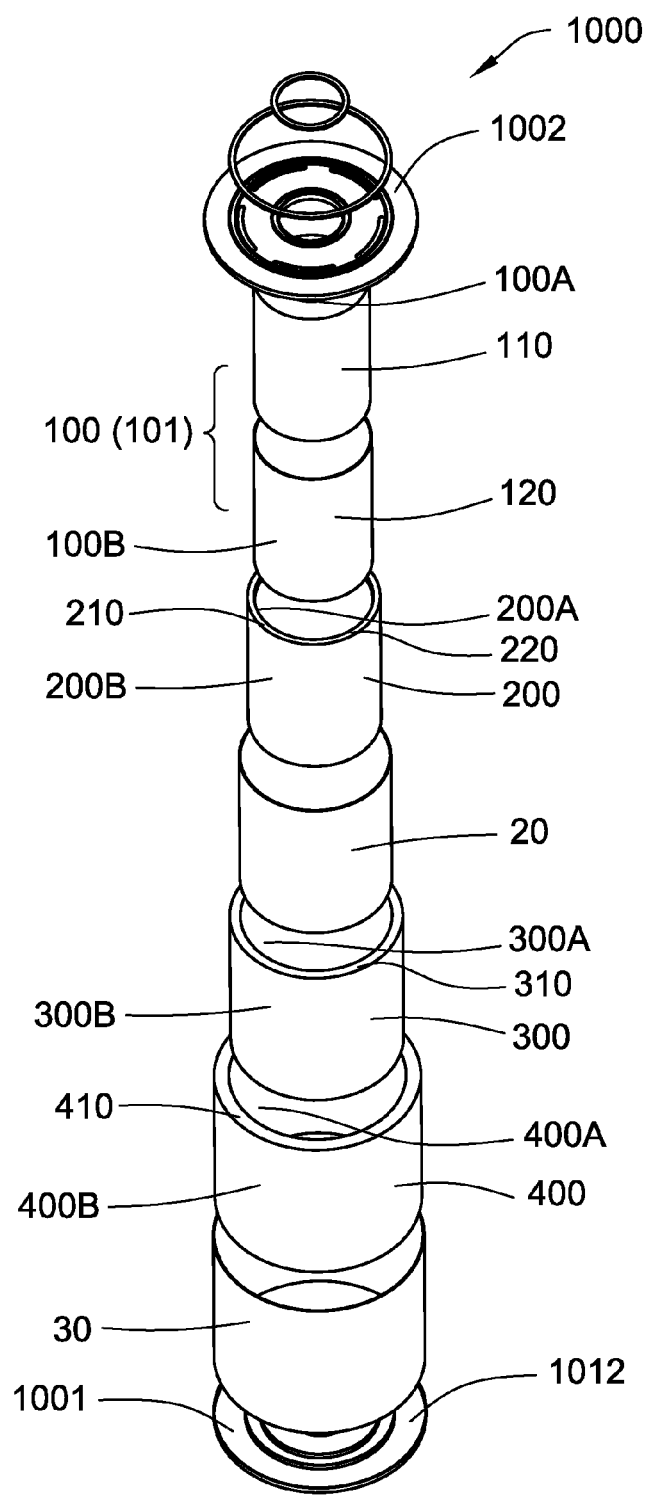
FIG. 2 shows an exploded diagrammatic view of the filter unit comprising coaxially arranged first, second, third, and fourth, hollow cylindrical fluid treatment filters shown in FIG. 1.

Using FIG. 2 for reference, the first hollow cylindrical fluid treatment filter 100 has an upstream surface 100A and a downstream surface 100B, and comprises a particulate removal and coalescer arrangement 101, the particulate removal and coalescer arrangement including a fibrous pleated porous medium 110 having a pore size in the range from about 0.5 microns to about 50 microns; and an oleophobic and/or hydrophobic fibrous medium 120. The first hollow cylindrical fluid treatment filter removes the majority of particulate matter in the process air, and coalesces the water and oil out of the air stream, so that the coalesced fluid (the coalesced discontinuous phase) can be passed from the downstream surface of the first hollow cylindrical fluid treatment filter along the first fluid flow path, and drained out (e.g., of the fuel tank inerting prefilter device). In an embodiment, the first hollow cylindrical fluid treatment filter has at least about a 99.9% oil aerosol removal efficiency.

A variety of fibrous materials are suitable for use as the fibrous pleated porous medium 110 and for the oleophobic and/or hydrophobic fibrous porous medium 120, and suitable materials are known in the art.

In one embodiment, the fibrous pleated porous medium comprises one of more layers of glass fibers, preferably laid down on a non-woven backing, such as a mesh backing and pleated into shape. The medium, or medium with backing, can be pleated as is known in the art, e.g., the medium can include a plurality of pleats axially extending between the axial ends of the fluid treatment filters. The pleats may include crests located at the outer annular portion of the fluid treatment filters and valleys located near the inner annular portion, the crests and valleys connected by a pair of pleat legs. The pleated medium may include fan-type pleats, wherein the crests extend radially outwardly from the inner annular portion, or pleats in a laid-over state, as illustrated in U.S. Pat. Nos. 5,543,047 and 5,252,207. Preferably, the medium, or medium with backing, includes an inner cylindrical support 10 such as a perforated core.

In one embodiment, the oleophobic and/or hydrophobic fibrous porous medium 120 comprises a polyester based felt meltblown material. The fibrous porous medium can be treated to render it oleophobic and hydrophobic, or more oleophobic and/or more hydrophobic, by a variety of techniques known in the art, for example, spray coating, or dip coating.

Preferably, the oleophobic and/or hydrophobic fibrous porous medium is wrapped around the fibrous pleated porous medium.

The second hollow cylindrical fluid treatment filter 200 has an upstream surface 200A and a downstream surface 200B, and comprises an ozone depleting arrangement 210, the ozone depleting arrangement comprising a ozone depleting material such as a deposited catalyst, for example, a deposited catalyst comprising manganese dioxide. A variety of materials are suitable for use as the ozone depleting arrangement (including a variety of catalytic depleting materials, such as, for example, a precious metal such as platinum, or a deposited catalyst, for example, manganese dioxide), and suitable materials are known in the art.

In one embodiment, the ozone depleting arrangement comprises manganese dioxide ($MnO_2$) catalyst, deposited on a material allowing fluid flow therethough, such as, for example, an open-cell foam pad 220. If desired, the ozone depleting arrangement comprising deposited $MnO_2$ catalyst can be wrapped around a central cylindrical support 20 such as a perforated core, mesh, or perforated medium. In one embodiment, the ozone depleting arrangement comprises manganese dioxide ($MnO_2$) deposited on an open-cell foam pad, and wrapped twice around the perforated core. The number of wraps or layers can be selected to provide adequate residence time for the catalyst to remove ozone ($O_3$) from the air stream, preferably, as residence time of at least about 0.6 mS, more preferably, at least about 0.8 mS. In one embodiment, the ozone depleting arrangement removes ozone to a level of about 10 ppb or less, from an initial level of about 500 ppb.

In accordance with a preferred embodiment of the invention, the ozone depleting arrangement is arranged upstream of the organic vapor depleting arrangement, so that ozone, that could damage (e.g., degrade) elements of the organic vapor depleting arrangement (e.g., elements such as activated carbon, zeolites and/or activated alumina), is depleted or removed from the air before the air contacts and passes through the organic vapor depleting arrangement.

The third hollow cylindrical fluid treatment filter 300 has an upstream surface 300A and a downstream surface 300B, and comprises an organic vapor depleting arrangement 310, the organic vapor depleting arrangement comprising activated carbon, zeolites, and/or activated alumina. A variety of materials are suitable for use as the organic vapor depleting arrangement, and suitable materials are known in the art. Additionally, a variety of filter configurations are suitable, and suitable configurations are known in the art.

For example, activated carbon particles or spheres can be immobilized between layers of a non-woven fabric, or bound (e.g., using a binder) into a monolith. Alternatively, or additionally, an activated carbon fabric can be used. If desired, the activated carbon can be replaced with, or combined with, for example, zeolites and/or activated alumina.

In one embodiment, the organic vapor depleting arrangement is wrapped around the ozone depleting arrangement, e.g., in one embodiment, the organic vapor depleting arrangement is wrapped 6 times around the ozone depleting arrangement. The number of wraps or layers can be selected to provide adequate residence time for the activated carbon, zeolites, and/or activated alumina to remove the VOCs from the air stream, preferably, as residence time of at least about 30 mS, more preferably, at least about 40 mS.

In some embodiments, the organic vapor depleting arrangement has any one or more of any of the following: an air permeability@200 pa of about 1500 $l/m^2/s$ for a single layer; an adsorber weight area of about 520+/−80 $g/m^2$, and/or an active surface area of about 1000 $m^2/g$ to about 2000 $m^2/g$.

The organic vapor depleting arrangement can be pleated (e.g., as described with respect to the fibrous pleated porous medium in the first hollow cylindrical fluid treatment filter above). If desired, the pleated organic vapor depleting arrangement can be copleated with the fourth hollow cylindrical fluid treatment element (as discussed below), or it can be utilized as a separate filter element. In one preferred embodiment of a pleated organic vapor depleting arrangement utilized as a separate filter element, the pleated arrangement further comprises a support such as a woven metallic mesh.

In accordance with a preferred embodiment of the invention, the organic vapor depleting arrangement is arranged in a fluid flow path between the ozone depleting arrangement and the fourth hollow cylindrical filter having an ULPA or HEPA filter rating, such that volatile organic compounds (VOCs) are depleted from the ozone-depleted process air before the air reaches the fourth filter having an ULPA or HEPA filter rating and before the air reaches the ASM, thus preventing or reducing damage to the fourth filter and/or the ASM, as they can be degraded due to the VOCs. The organic vapor depleting arrangement is particularly useful in reducing spikes of VOCs, wherein excess VOCs can be released downstream at significantly lower concentrations over time after a spike incident.

The fourth hollow cylindrical fluid treatment filter 400 has an upstream surface 400A and a downstream surface 400B, and comprises a particulate removal arrangement 410 comprising a pleated porous medium, the filter having an ultra low penetration air (ULPA) filter rating or a high efficiency particulate air (HEPA) filter rating.

In contrast with the first hollow cylindrical fluid treatment filter, that removes the majority of particulate matter in the process air, the fourth hollow cylindrical fluid treatment filter is a "polishing" filter, removing all, or nearly all, of the particles remaining in the air stream, and thus, the air passing along the second fluid flow path from the fourth filter downstream surface comprises a filtered ULPA-rated or filtered HEPA-rated organic vapor-depleted ozone-depleted and discontinuous phase-depleted fluid.

A variety of materials are suitable for use as the pleated porous medium, the filter having an ultra low penetration air (ULPA) filter rating or a high efficiency particulate air (HEPA) filter rating, and suitable materials are known in the art. Additionally, a variety of filter configurations are suitable, and are known in the art.

Suitable materials include fibrous materials, such as glass fibers and/or polymer media such as meltblown media, or membranes, such as polymeric membranes.

The ULPA- or HEPA-rated filter can be pleated as described with respect to the fibrous pleated porous medium in the first hollow cylindrical fluid treatment filter above). If desired, it can be copleated with the organic vapor depleting arrangement (as discussed above), or it can be utilized as a separate filter element. In one preferred embodiment of a pleated filter utilized as a separate filter element, the pleated arrangement further comprises one or more supports or wraps 30 such as woven metallic meshes (in one embodiment, the porous medium is sandwiched between the meshes).

The fourth hollow cylindrical fluid treatment filter preferably arranged to provide an adequate target media velocity, e.g., of at most about 10.5 ft/min (about 3.2 m/min), to provide high efficiency filtration to process the air.

The first hollow cylindrical fluid treatment filter, the second hollow cylindrical fluid treatment filter, the third hollow cylindrical fluid treatment filter, and the fourth hollow cylindrical fluid treatment filter are coaxially arranged, forming a filter unit 500 having a bottom end 501 and a top end 502, wherein the first endcap 1001 is bonded to the bottom end of the filter unit and the second endcap 1002 is bonded to the top end of the filter unit, providing a fuel tank inerting prefilter assembly 1000. Suitable bonding materials and/or adhesives for bonding the endcaps to the filter units are known in the art. In one embodiment, the bonding material is a phenolic resin.

Suitable materials for endcaps are known in the art.

In the illustrated configurations shown in FIGS. 3A, 3B, 3C, 3D, 4A, and 6, the first endcap 1001 has a first side 1011 and a second side 1012, a central opening 1010 passing through the first and second sides, and a fluid flow channel 1050 communicating with a coalesced fluid outlet 1060. As will be explained in more detail below, in both "inside-out" and "outside-in" flow applications, the central opening 1010 communicates with both the first fluid flow path 601 and the second fluid flow path 602, and the fluid flow channel 1050 (not shown in FIG. 3D) and coalesced fluid outlet 1060 communicate with the second fluid flow path 602. If second endcap 1002 has a central opening, it is plugged or covered before filter unit 500 is used.

In the configuration shown in FIGS. 3A, 3B, and 4A, the fluid flow channel 1050 has step-wise channel portions 1051 and annular channel portions 1052. In an embodiment (e.g., as shown in FIGS. 1 and 3A), for ease of assembling the filters, the first endcap 1000 comprises a first section 1001A and a second section 1001B, wherein the coalesced fluid exits through a gap between the sections, the gap being provided by a lower step of the step-wise channel portion contacting the recess 1075 in section 1001B.

With respect to ease of assembly, illustratively, first hollow cylindrical fluid treatment filter 100 and inner support 10 are bonded to first section 1001A (e.g., to form "part 1"), and second, third, and fourth hollow cylindrical fluid treatment filters 200, 300, 400, as well as supports 20 and 30 (20 and 30 preferably comprising perforated cores, meshes, or perforated media) are bonded to second section 1001B (e.g., to form "part 2"), part 2 is end capped by second endcap 1002, and part 1 is pushed through the hollow interior of second hollow cylindrical fluid treatment filter 200 into contact with the inner surface of second endcap 1002.

In the configuration shown in FIG. 6A, the fluid flow channel 1050 does not include a step-wise channel portion, it provides a straight through flow path, in the configuration shown in FIG. 6B, the fluid flow channel 1050 does include a step-wise channel portion.

As shown particularly in FIGS. 4A, 5 (showing the filter 500 without endcaps) 6A, and 6B, the filter assembly 1000 defines a first fluid flow path 601 and a second fluid flow path 602, wherein (i) the first hollow cylindrical fluid treatment filter is disposed across the first fluid flow path 601 and the second fluid flow path 602, and (ii) the second hollow cylindrical fluid treatment filter, the third hollow cylindrical fluid treatment filter, and the fourth hollow cylindrical fluid treatment filter are disposed across the second fluid flow path 602.

In a preferred embodiment, the filter assembly has a pressure range from 0 psig to about 100 psig.

In the embodiment illustrated in FIGS. 6A and 6B, a fuel tank inserting filter device 1500 comprises the fuel tank inerting prefilter assembly 1000 arranged in a housing 1550, the housing having a first section 1551 and a second section 1552. The illustrated first housing section 1551 comprises an inlet port 1561 and an outlet port 1562, and a coalesced fluid outlet port 1563, the second section 1552 comprising a cavity 1560 for receiving the fuel tank inerting prefilter assembly, wherein the filter assembly is arranged in the housing, the inlet port 1561 directing untreated fluid (process air) into the first fluid flow path 601 and the second fluid flow path 602, the outlet port 1562 directing treated fluid (filtered ULPA-rated or filtered HEPA-rated organic vapor-depleted ozone-depleted and discontinuous phase-depleted fluid) from the second fluid flow path, and the coalesced fluid outlet port 1563 directing coalesced fluid (discontinuous phase coalesced fluid separated from a discontinuous phase-depleted fluid) from the first fluid flow path 601 and out of the device.

The filter devices and housings can be any suitable shape and can be configured (e.g., with respect to one or more of any of the following: the number of sections, the inlet, the outlet, and the coalesced fluid outlet port) as is known in the art, and the housing can have one or more additional components such as ports.

As shown in FIG. 7, filtered gas from the device can be passed through an air separation module (ASM) to a fuel tank.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fuel tank inerting prefilter assembly comprising:
   (a) a first endcap, wherein the first endcap includes a first side and a second side and a central opening passing from the first side through the second side;
   (b) a second endcap;
   (c) a first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium;
   (d) a second hollow cylindrical fluid treatment filter comprising an ozone depleting arrangement, the ozone depleting arrangement comprising an ozone depleting material;
   (e) a third hollow cylindrical fluid treatment filter comprising an organic vapor depleting arrangement, the organic vapor depleting arrangement comprising activated carbon, zeolites, and/or activated alumina; and,
   (f) a fourth hollow cylindrical fluid treatment filter comprising a particulate removal arrangement comprising a pleated porous medium, the filter having an ultra low penetration air (ULPA) filter rating or a high efficiency particulate air (HEPA) filter rating;
   wherein the first hollow cylindrical fluid treatment filter, the second hollow cylindrical fluid treatment filter, the third hollow cylindrical fluid treatment filter, and the fourth hollow cylindrical fluid treatment filter are coaxially arranged, forming a filter unit having a top end and a bottom end; and,
   wherein the first endcap is bonded to the top end of the filter unit and the second endcap is bonded to the bottom end of the filter unit;
   the filter assembly defining a first fluid flow path and a second fluid flow path, wherein (i) the first hollow cylindrical fluid treatment filter is disposed across the first fluid flow path and the second fluid flow path, and (ii) the second hollow cylindrical fluid treatment filter, the third hollow cylindrical fluid treatment filter, and the fourth hollow cylindrical fluid treatment filter are disposed across the second fluid flow path.

2. The fuel tank inerting prefilter assembly of claim 1, wherein the fourth hollow cylindrical fluid treatment filter comprising a pleated porous medium comprises a fibrous glass medium and/or a polymer membrane.

3. The fuel tank inerting prefilter assembly of claim 1, wherein the third hollow cylindrical fluid treatment filter comprising an organic vapor depleting arrangement comprises particles, a fibrous layer, and/or a monolith.

4. The fuel tank inerting prefilter assembly of claim 1, including a coaxial gap between the coaxially arranged first hollow cylindrical fluid treatment filter and the second hollow cylindrical fluid treatment filter.

5. The fuel tank inerting prefilter assembly of claim 4, wherein the first fluid flow path includes the coaxial gap.

6. The fuel tank inerting prefilter assembly of claim 1, further comprising at least one support core comprising a mesh or a perforated medium, the support core being coaxially arranged with the first hollow cylindrical fluid treatment filter, the second hollow cylindrical fluid treatment filter, the third hollow cylindrical fluid treatment filter, and the fourth hollow cylindrical fluid treatment filter.

7. The fuel tank inerting prefilter assembly of claim 1, further comprising a support core comprising a mesh or a perforated medium coaxially arranged between the first hollow cylindrical fluid treatment filter and the second hollow cylindrical fluid treatment filter.

8. The fuel tank inerting prefilter assembly of claim 1, wherein the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

9. A fuel tank inerting prefilter device, comprising the fuel tank inerting prefilter assembly of claim 1, and a housing comprising a first section and a second section, the first section comprising an inlet port and an outlet port and a coalesced fluid outlet port, the second section comprising a cavity for receiving the fuel tank inerting prefilter assembly, wherein the filter assembly is arranged in the housing, the inlet port directing untreated fluid into the first fluid flow path and the second fluid flow path, the outlet port directing treated fluid from the second fluid flow path, and the coalesced fluid outlet port directing coalesced fluid from the first fluid flow path.

10. The fuel tank inerting prefilter assembly of claim 2, wherein the third hollow cylindrical fluid treatment filter comprising an organic vapor depleting arrangement comprises particles, a fibrous layer, and/or a monolith.

11. The fuel tank inerting prefilter assembly of claim 2, including a coaxial gap between the coaxially arranged first hollow cylindrical fluid treatment filter and the second hollow cylindrical fluid treatment filter.

12. The fuel tank inerting prefilter assembly of claim 3, including a coaxial gap between the coaxially arranged first hollow cylindrical fluid treatment filter and the second hollow cylindrical fluid treatment filter.

13. The fuel tank inerting prefilter assembly of claim 2, wherein the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

14. The fuel tank inerting prefilter assembly of claim 3, wherein the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

15. The fuel tank inerting prefilter assembly of claim 4, wherein the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

16. The fuel tank inerting prefilter assembly of claim 5, wherein the first endcap comprises a fluid flow channel including a step-wise channel portion and an annular channel portion, and a coalesced fluid outlet, the fluid flow channel communicating with the coalesced fluid outlet, wherein the first fluid flow path includes the fluid flow channel and the coalesced fluid outlet.

17. A fuel tank inerting prefilter device, comprising the fuel tank inerting prefilter assembly of claim 8, and a housing comprising a first section and a second section, the first section comprising an inlet port and an outlet port and a coalesced fluid outlet port, the second section comprising a cavity for receiving the fuel tank inerting prefilter assembly, wherein the filter assembly is arranged in the housing, the inlet port directing untreated fluid into the first fluid flow path and the second fluid flow path, the outlet port directing treated fluid from the second fluid flow path, and the coalesced fluid outlet port directing coalesced fluid from the first fluid flow path.

18. A method for removing contaminants from process air, the method comprising
   (a) passing the process air through a first hollow cylindrical fluid treatment filter having a first filter upstream surface and a first filter downstream surface, the first hollow cylindrical fluid treatment filter comprising a particulate removal and coalescer arrangement, the particulate removal and coalescer arrangement including a fibrous pleated porous medium having a pore size in the range from about 0.5 microns to about 50 microns; and an oleophobic and/or hydrophobic fibrous medium, providing a discontinuous phase coalesced fluid separated from a discontinuous phase-depleted fluid;
   (b) passing the discontinuous phase-depleted fluid from the first filter downstream surface through a second hollow cylindrical fluid treatment filter having a second filter upstream surface and a second filter downstream surface, the second hollow cylindrical fluid treatment filter comprising an ozone depleting arrangement, the ozone depleting arrangement comprising an ozone depleting material, providing an ozone- and discontinuous phase-depleted fluid passing from the second filter downstream surface;
   (c) passing the ozone- and discontinuous phase-depleted fluid through a third hollow cylindrical fluid treatment filter having a third filter upstream surface and a third filter downstream surface, the third hollow cylindrical filter comprising an organic vapor depleting arrangement, the organic vapor depleting arrangement comprising activated carbon, zeolites, and/or activated alumina, providing an organic vapor-depleted ozone-depleted and discontinuous phase-depleted fluid passing from the third filter downstream surface; and,
   (d) passing the organic vapor-depleted ozone-depleted and discontinuous phase-depleted fluid through a fourth hollow cylindrical fluid treatment filter having a fourth filter upstream surface and a fourth filter downstream surface, the fourth hollow cylindrical fluid treatment filter comprising a particulate removal arrangement comprising a pleated porous medium, the filter having an ultra low penetration air (ULPA) filter rating or a high efficiency particulate air (HEPA) filter rating, providing a filtered ULPA-rated or filtered HEPA-rated organic vapor-depleted ozone-depleted and discontinuous phase-depleted fluid passing from the fourth filter downstream surface.

19. A method for removing contaminants from process air, the method comprising passing the process air through the fuel tank inerting assembly of claim 1, wherein the fourth hollow cylindrical treatment filter has an upstream surface and a downstream surface the method including passing a coalesced discontinuous phase fluid along the first fluid flow path, and passing a discontinuous phase-depleted fluid from the downstream surface of the fourth hollow cylindrical treatment filter.

20. The method of claim 19, further comprising passing the discontinuous phase-depleted fluid from the downstream surface of the fourth hollow cylindrical treatment filter through an Air Separation Module.

* * * * *